US007966466B2

(12) United States Patent
Kershaw et al.

(10) Patent No.: US 7,966,466 B2
(45) Date of Patent: Jun. 21, 2011

(54) MEMORY DOMAIN BASED SECURITY CONTROL WITH DATA PROCESSING SYSTEMS

(75) Inventors: Daniel Kershaw, Cambridge (GB); Stuart David Biles, Little Thurlow (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 531 days.

(21) Appl. No.: 12/068,449

(22) Filed: Feb. 6, 2008

(65) Prior Publication Data

US 2008/0250217 A1    Oct. 9, 2008

(30) Foreign Application Priority Data

Apr. 3, 2007    (GB) .................................. 0706504.8

(51) Int. Cl.
*G06F 12/00* (2006.01)
(52) U.S. Cl. ................ 711/163; 711/173; 713/1; 713/2; 713/100
(58) Field of Classification Search .................. 711/155, 711/163, 173
See application file for complete search history.

(56) References Cited

U.S. PATENT DOCUMENTS

| 4,087,856 | A | 5/1978 | Attanasio |
| 4,545,012 | A | 10/1985 | Clancy et al. |
| 4,809,160 | A | 2/1989 | Mahon et al. |
| 5,107,443 | A | 4/1992 | Smith et al. |
| 6,633,963 | B1 | 10/2003 | Ellison et al. |
| 7,134,006 | B2 * | 11/2006 | Flanigan ........................ 713/1 |
| 2001/0052054 | A1 | 12/2001 | Franke et al. |
| 2004/0158736 | A1 | 8/2004 | Watt et al. |
| 2004/0168047 | A1 | 8/2004 | Fukai et al. |
| 2005/0030824 | A1 | 2/2005 | Kreuchauf et al. |
| 2005/0114616 | A1 * | 5/2005 | Tune et al. ..................... 711/163 |
| 2005/0262568 | A1 * | 11/2005 | Hansen et al. ................. 726/26 |

FOREIGN PATENT DOCUMENTS

| EP | 0 859 319 | 8/1998 |
| GB | 2 260 004 | 3/1993 |
| JP | 57-83850 | 5/1982 |
| JP | 2004-280801 | 10/2004 |

OTHER PUBLICATIONS

U.S. Appl. No. 12/068,448, filed Feb. 6, 2008, Kershaw et al.
UK Search Report dated Aug. 13, 2007 for GB 0706491.8.
Office Action mailed Oct. 27, 2010 in co-pending U.S. Appl. No. 12/068,448.
Chinese Office Action issued Feb. 24, 2011 in CN 200810091318 and English translation.

* cited by examiner

*Primary Examiner* — Reginald G Bragdon
*Assistant Examiner* — Gurtej Bansal
(74) *Attorney, Agent, or Firm* — Nixon & Vanderhye P.C.

(57) ABSTRACT

Access to memory address space is controlled by memory access control circuitry using access control data. The ability to change the access control data is controlled by domain control circuitry. Whether or not an instruction stored within a particular domain, being a set of memory addresses, is able to modify the access control data is dependent upon the domain concerned. Thus, the ability to change access control data can be restricted to instructions stored within particular defined locations within the memory address space thereby enhancing security. This capability allows systems to be provided in which call forwarding to an operating system can be enforced via call forwarding code and where trusted regions of the memory address space can be established into which a secure operating system may write data with increased confidence that that data will only be accessible by trusted software executing under control of a non-secure operating system.

39 Claims, 7 Drawing Sheets

M = general memory management (MMU enable, translation table pointer, endianess, DCSR, DCR)

E = exception control - (vector table pointers, vector enable)

CM = cache maintenance

S = SMC instruction enable

MEMORY DOMAIN BASED SECURITY CONTROL WITH DATA PROCESSING SYSTEMS

BACKGROUND OF THE INVENTION

1. Field of the Invention

This invention relates to the field of data processing systems. More particularly, this invention relates to data processing systems having security mechanisms which control access to a given memory address in dependence upon access control data.

2. Description of the Prior Art

It is known to provide data processing systems in which memory access control circuitry is used to control whether access is permitted to a given memory address depending upon access control data. As an example, known systems such as ARM processors produced by ARM Limited of Cambridge England, provide privileged mode operation and user mode operation and memory address regions can be defined by access control data such that they are only accessible when operating in the privileged mode of operation. Other known computer systems implement hardware capability lists whereby the ability to access key CPU control resources can be granted on a resource-by-resource or an application-by-application basis. Such systems use a segmented memory system to support multi-user operating systems and implement permission hierarchies analogous to, but finer grained than, the user/privileged split discussed above as well as providing support for a form of virtual addressing. A discussion of such computer architectures may be found in "Capability-Based Computer Systems" by Henry M Levy, Digital Equipment Corporation, 1984.

The flexibility to be able to program the access control data for use by the memory access control circuitry is desirable as this permits the hardware to be used with a variety of different software subject to the necessary programming of the access control data. However, a significant vulnerability within such systems is unauthorized code changing the access control data so as to provide undesired access to given memory addresses. When operating in the privileged mode access is normally available to all parts of the system. In user mode it may be necessary to call for a service in the privileged mode which is provided by privileged mode code. Entry into the privileged mode is by an exception vector and is strictly controlled.

One way of addressing the above problems is to provide mechanisms such as the TrustZone features (which can be considered as an extra layer of privilege) provided by some of the processors of ARM Limited Cambridge England. These processors provide a secure state of operation and can restrict the ability to change memory access control data to operations taking place within the secure state and then tightly control the code capable of operating in a secure state as well as the ways in which entry and exit can be made to the secure state. Whilst such mechanisms can provide a high degree of security, they typically require significant amount of investment in the writing of suitable software code to operate in the secure state such that the software code has the ability to appropriately control a large number of different aspects of the non-secure states of operation. In addition, as the code which executes in the secure state becomes larger, more complex and more capable, it generally also itself becomes more vulnerable to security problems. As a general principle, small, simple code is more secure and is less likely to contain security vulnerabilities unwittingly introduced as code complexity increases.

SUMMARY OF THE INVENTION

Viewed from one aspect the present invention provides apparatus for processing data, said apparatus comprising:

a memory addressable with a memory address having a value within a memory address space, said memory address space having a plurality of domains, a domain comprising a set of memory addresses and each memory address belonging to at least one domain;

processing circuitry coupled to said memory and responsive to a sequence of program instructions associated with respective memory addresses to perform data processing operations;

memory access control circuitry coupled to at least one of said memory and said processing circuitry and responsive to access control data for different regions of said memory address space to control whether said processing circuitry can access a given memory address; and domain control circuitry coupled to said processing circuitry and responsive to with which of said plurality of domains a memory address of an instruction to be processed is associated to control whether said instruction can change said access control data.

The invention recognizes that an improvement in overall security can be achieved without undue additional overhead and reprogramming (e.g. partitioning of code, writing of special purpose code, writing of secure state code etc) by continuing to use memory access control circuitry responsive to access control data, but then restricting the ability to change the access control data in dependence upon a domain (which is a set of memory addresses, either contiguous or non-contiguous) an instruction seeking to change that access control data is stored within. The locations within the overall software being executed which are legitimately intended to be able to change the access control data are relatively confined and accordingly the domain control circuitry can be arranged to restrict the ability to change the access control data to code executing from within these relatively small areas. As an example, a system designer may be able to establish that the only legitimate place within a system from which instructions will execute seeking to change the access control data is from within the operating system kernel code. Thus, unauthorized software stored elsewhere in the system will be prevented from changing the access control data by the domain control circuitry and accordingly memory access control circuitry can continue to provide proper protection based upon the legitimate access control data.

Whilst the memory access control circuitry can operate in a variety of different ways in controlling access to a given memory address in dependence upon various system state parameters, e.g. including from which memory location a particular program instruction is executing, the technique is well suited to systems operating in a plurality of modes with the access control data specifying access permissions in dependence upon the current mode of operation of a system, e.g. providing access to certain memory locations only to privileged mode processes and denying such accesses to user mode processes.

The level of access provided in dependence upon the access control data can vary and may include multiple levels, such as no access, full access and access controlled by other parameters (e.g. as controlled by parameters relating to processing mode).

The access control data can also be used to control whether or not certain instructions can be executed from within certain domains, e.g. software interrupt instructions (such as monitor call instructions) of the type which can be used as part of switch from non-secure state to secure state.

Whilst the present technique can be used within systems employing purely physically mapped memory address space, the present techniques are well suited to systems employing virtual memory address space with the plurality of the domains being domains within the virtual memory address space and memory management circuitry being used to map virtual memory addresses to physical memory addresses using translation table data, that translation table data being access control data. Protecting the ability to reprogram translation table data using the domain control circuitry discussed above provides a significant enhancement to the security of a system whilst requiring relatively little modification of existing code and enabling backward compatibility, although with reduced levels of security. The translation table data referred to above may be stored at a location specified by a translation table pointer with access to that translation table pointer being controlled by the domain control circuitry. As an example, the translation table data may be stored within a secure domain, and it is desired to prevent a security breach by avoiding the ability of a rogue code to merely point to alternative translation table data stored elsewhere, with that alternative translation table data giving unauthorized access to certain memory addresses.

Whilst it would be possible for the domains to have fixed capabilities in terms of their ability to change access control data, as well as other abilities, the flexibility of the system is enhanced when these capabilities are programmable. Thus, the programmable capabilities for each domain can include one or more capabilities specifying parameters that control the manner in which the main control circuitry either permits or does not permit code executing from within that domain to change access control data.

A further programmable capability which can be provided on a domain-by-domain basis is the ability for program instructions within a domain to alter the programmable capabilities themselves. In this way, a system can be arranged to boot into a domain which can set up in a secure manner the programmable capabilities for the system as a whole and then restrict the ability to change those capabilities to itself. An example of trusted software which will be permitted to change access control data in accordance with the above techniques is a kernel portion of a operating system. Such a kernel portion can be stored within a domain having the ability to change access control data whilst other portions of the operating system, which may be considerable in number and large in size are not stored within domains permitted to change the access control data. Thus, the need to verify and control the code capable of changing the access control data can be restricted to verifying and controlling the kernel portion of the operating system, which portion is relatively stable and small. The large and relatively frequently changing nature of the other parts of the operating system need not undermine the security measures provided by the main control circuitry.

In the above context it will be appreciated that an application program will typically be stored within a domain not permitted to change the access control data as it would not be normal programming practice for application programs to change access control data; this is more properly the responsibility of the operating systems.

The integrity of the kernel of the operating system can be enhanced by arranging the access control data such that an application program will not have the rights to directly read the kernel itself and make calls to the kernel itself with such calls instead being made via a call forwarding program stored within a region memory that does have access to the kernel. Such a call forwarding program can be relatively simple and accordingly relatively easy to write securely and check unauthorized alterations.

In accordance with other embodiments data which is still regarded as requiring protection, such as decrypted source copyright material which would enable good quality unauthorized copies to be made, may be written into a trusted region of the memory such that it can be manipulated by trusted software within the non-secure state, such as trusted decompression codecs executing from within the non-secure operating system or from within the trusted region itself. Thus, a layered level of security may be achieved.

Viewed from another aspect the invention provides a method of processing data, said method comprising the steps of:

storing program instructions within a memory addressable with a memory address having a value within a memory address space, said memory address space having a plurality of domains, a domain comprising a set of memory addresses and each memory address belonging to at least one domain;

in response to a sequence of program instructions associated with respective memory addresses, performing data processing operations;

in response to access control data for different regions of said memory address space, controlling whether a given memory address can be accessed; and in response to with which of said plurality of domains a memory address of an instruction to be processed is associated, controlling whether said instruction can change said access control data.

Viewed from a further aspect the present invention provides a computer program storage medium storing a computer program for controlling a computer to perform in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
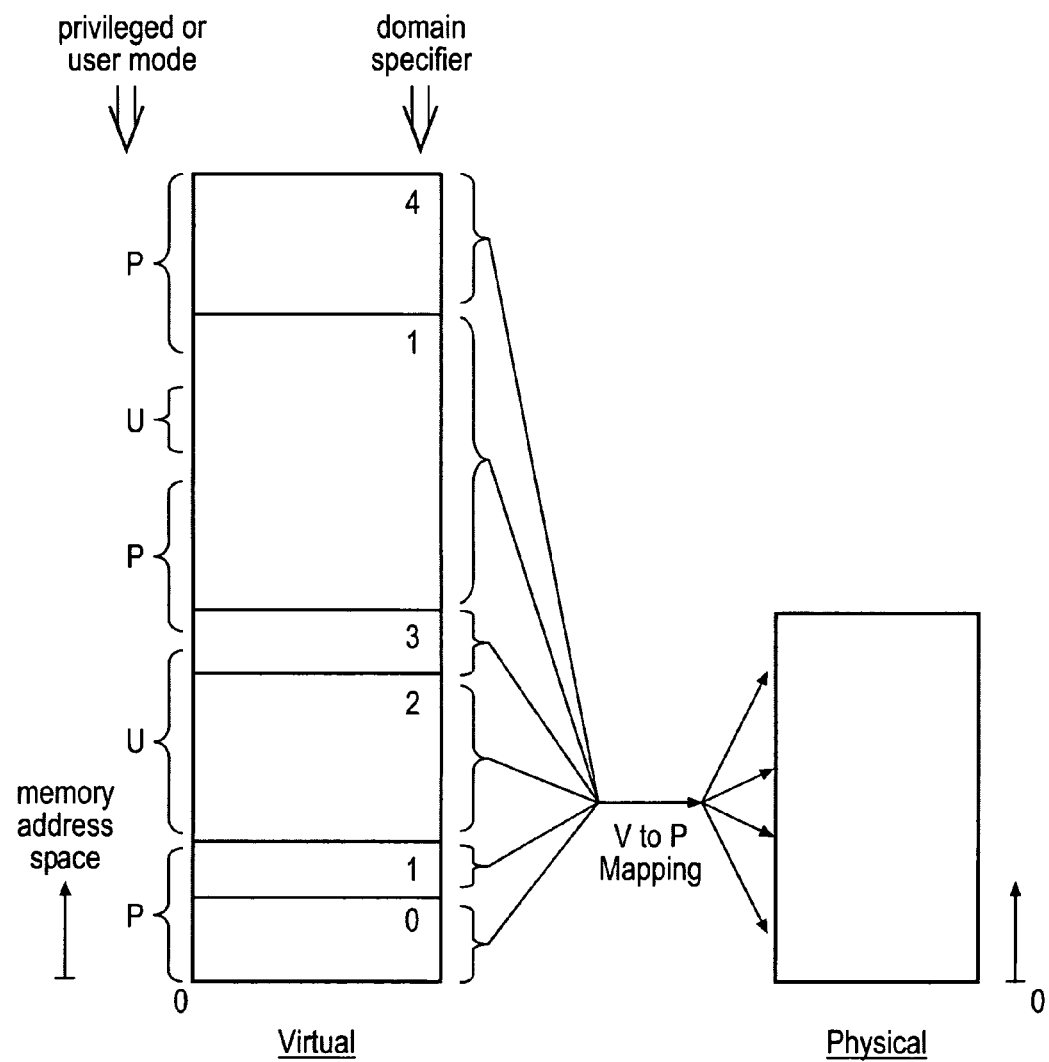
FIG. 1 schematically illustrates a relationship between virtual memory address space and physical memory address space.

FIG. 1 schematically illustrates a virtual memory address space divided into a plurality of memory domains, each having an associated domain specifier. It will be seen that these domains can have varying sizes and may be contiguous or non-contiguous. Also illustrated are access control data parameters associated with virtual memory addresses indicating whether particular regions of that virtual memory address space are accessible to only privileged mode processes or both user mode or privileged mode processes (p=privileged mode only; u=privileged mode or user mode). As illustrated, the various memory addresses within the virtual memory address space are mapped to physical addresses within the physical address space. A wide variety of such mappings are possible, as will be familiar to those in this technical field. The virtual to physical mapping is performed in dependence upon translation table data (page table data) which is stored within the memory address space itself and pointed to by a translation table pointer stored within a translation table pointer register. A memory management unit may also be provided to action such translation table data and to associate access control data (such as the privileged only, privileged/user data) with the different regions of memory. The domain specifiers can be domain specifiers of the form provided by processors operating in accordance with the ARM processor architecture as described in the ARM Architecture Reference Manual as provided by ARM Limited Cambridge, England. These domain specifiers (for example sixteen different domain specifiers) are provided already as a means of differentiating between different sets of memory addresses within the virtual memory address space in a manner which is utilized for other purposes different from the purposes of the present techniques. These domain specifiers can be reused for the current techniques.

Figure 2:
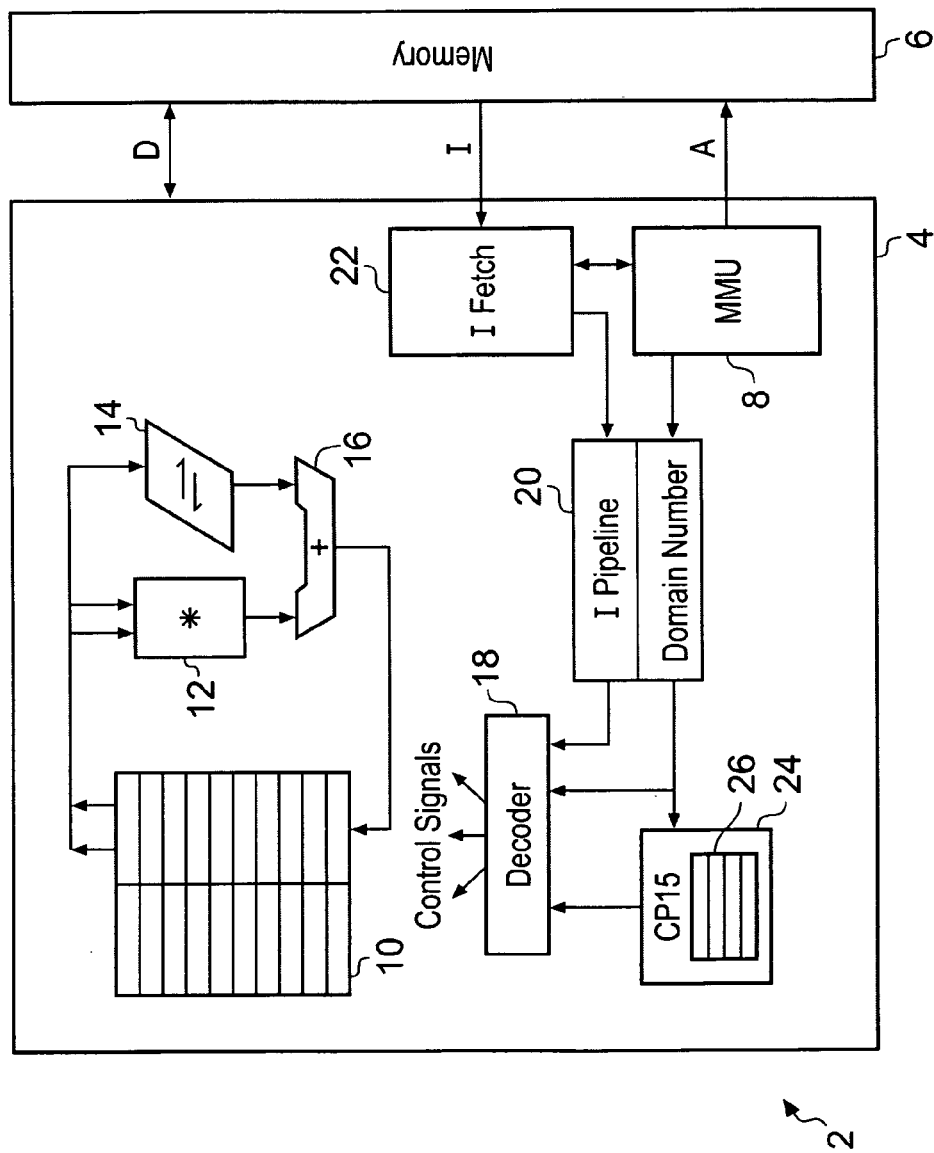
FIG. 2 schematically illustrates a data processing system incorporating memory access control circuitry, instruction access control circuitry and domain access control circuitry.

FIG. 2 illustrates a data processing system 2 comprising a processor core 4 coupled to a memory 6. The memory 6 provides a physically addressed memory address space storing both data and instructions. The processor core 4 executes program instructions utilizing a virtual memory address space and an MMU 8 within the processor core 4 is responsible for controlling the process of mapping between virtual addresses and physical addresses. Data processing operations are performed in response to program instruction utilizing a data path comprising a register bank 10, a multiplier 12, a shifter 14 and an adder 16. These data path elements 10, 12, 14, 16 act under the control of control signals generated by an instruction decoder 18, which is in turn responsive to instructions within an instruction pipeline 20. Instructions are supplied to the instruction pipeline 20 by an instruction fetch unit 22 which retrieves the instructions from the memory 6. A configuration coprocessor CP15 24 is provided which includes various configuration registers 26 used to configure the data processing system 2. These configuration registers 26 may be written to and read using coprocessor transfer instructions fetched from the memory 6 via the instruction fetch unit 22. The ability to write and read such configuration registers 26 is restricted by the domain access control circuitry. The domain access control circuitry is responsive to the domain of the address from which the program instruction seeking to change the configuration register 26 was fetched as read from the memory management unit 8. This information is passed as a domain specifier along with the instruction concerned within the instruction pipeline 20 until that instruction reaches the point at which it is to be executed. The configuration registers 26 include programmable capability registers specifying the capabilities associated with each of the different domains within the memory as will be described later herein.

The domain number is extracted from the section descriptor being used by the MMU 8 for the fetched instruction's virtual address. Conceptually, the domain number is used to obtain the capabilities afforded to that domain by looking up the appropriate configuration register (domain capabilities descriptor register) 26 resident in CP15 24. The instruction, the domain it was fetched from and the description of the capabilities afforded to the domain are fed (directly or indirectly) into the decoder 18, which determines whether the fetched instruction is allowed to execute or should generate an exception, e.g. if the instruction attempts to write to a CP15 register for which it doesn't have a capability, then an exception should be generated.

In some embodiments, the domain number itself need not be sent to the instruction decoder 18—only the capabilities assigned to the particular domain. However considering the properties of code locality, some embodiments may "cache" a local copy of a domain's capabilities—and then implement a state machine to confirm whether or not the actual domain number of the fetched instruction matches that of the cached copy—if not the new domain's capabilities will be fetched. This arrangement is likely to help improve the maximum frequency at which a design is able to run.

Also associated with the instruction pipeline 20, the instruction fetch unit 22 and the memory management unit 8 is instruction access control circuitry which serves to note when a change is made between domains from which instructions are being executed and if management for such transitions is indicated as in force then to check that the first instruction (or instruction at a fixed relation thereto) within the new domain is a permitted instruction (e.g. a member of a set of permitted instructions). These permitted instructions can be chosen to have encodings which correspond to no operation instructions for the elements within the data processing system 2 other than the instruction access control circuitry. The domain control circuitry by controlling access to the configuration registers 26, which include a pointer to the translation table, provides a means for restricting changes to the access control data employed by the memory management unit 8. Accordingly, it can resist unauthorized attempts to subvert the security provided by the memory management unit 8 which would result from reprogramming of the translation table data pointer to point to new translation table data providing unauthorized access to certain memory regions. It will be appreciated by those in this technical field that the data processing system 2 shown in FIG. 2 will typically include many further circuit elements but these have been omitted from FIG. 2 for the sake of clarity and are not necessary for an understanding of the current techniques.

Figure 3:
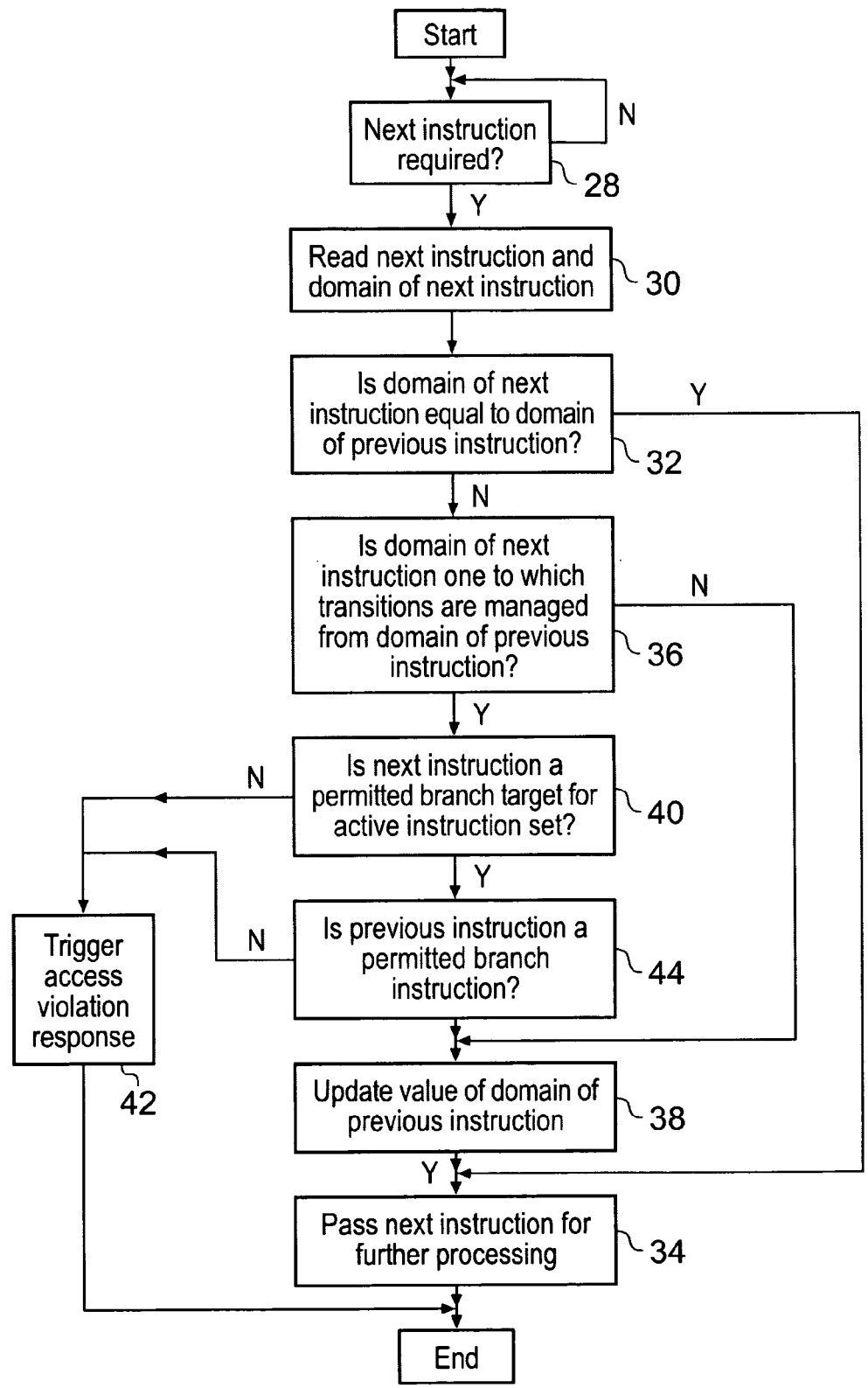
FIG. 3 is a flow diagram schematically illustrating the operation of checking for a permitted branch target instruction when moving from one domain to another domain.

FIG. 3 is a flow diagram schematically illustrating the operation of the instruction access control circuitry. At step 28 the processing waits until a next instruction is required to be fetched/executed. At step 28 when a next instruction is required, then the next instruction is fetched from the memory 6 and the domain of that next instruction read from the memory management unit 8 at step 30. Step 32 determines whether the domain of the next instruction is the same as the domain of the previous instruction (or an instruction at a fixed or programmable location preceding the next instruction). If the domain is the same and has not changed, then processing proceeds to step 34 at which the next instruction is passed for further processing. However, if the determination at step 32 that the domain has changed, then the processing proceeds to step 36.

Step 36 determines from the domain of the next instruction and the domain of the previous instruction whether or not the inter-domain transition concerned is one which is to be subject to control to ensure that the target instruction is a permitted target instruction. The selection of which inter-domain transitions are thus managed can be made using programmable capabilities registers with a programmable capability register associated with each domain and indicating for each domain which of the domains transitions into the other domains are or are not to be subject to permitted branch target instruction checking. If the determination at 36 is that the domain transition is not one which gives rise to branch target instruction checking, then processing proceeds to step 38 at which the value of the domain stored as the previous domain is updated (to reflect that a change of domain has occurred) and then processing proceeds to step 34 to pass the next instruction to further processing as previously discussed.

If the determination at step 36 was that the domain transition is one for which branch target instruction checking is to be performed, then processing proceeds to step 40 at which a determination is made as to whether or not the next instruction is a permitted branch target for the instruction set which is active for that next instruction. The data processing system 2 described in FIG. 2 may support multiple instruction sets (e.g. the ARM and Thumb instruction sets in the case of an ARM processor) and each of these instruction sets has its own set of one or more permitted branch target instructions. The permitted branch target instructions for different target instruction sets have different encodings. This avoids any ambiguity as to which instruction set is to be active at the branch target point. Certain branches may also involve an instruction set switch as part of the branch instruction (e.g. ARM/Thumb BLX instructions) and the active instructive set against which the permitted branch instruction targets are checked is based upon which instruction set will be active for that branch target taking into account any instruction set switching which is to accompany the branching operation. If the determination at step 40 is that the next instruction is not a permitted branch target instruction, then processing proceeds to step 42, at which an access violation response is triggered. This access violation response can take a variety of different forms including execution of specific access violation response code, execution of domain violation code shared with other domain violations when the domains are being used for more branch target checking, a memory abort (with appropriate exception code as necessary) or an undefined instruction exception. There are also many other types of possible access violation response and these may be chosen by the system designer. A particularly severe response would be to reset the system.

If the determination at step 40 was that the next instruction is a permitted branch target instruction, then processing proceeds to step 44 at which a determination is made as to whether or not the previous instruction was a permitted branch instruction. In this way, both the branch instruction and the branch target instruction can be checked to verify appropriate entry into a new memory domain from a permitted instruction and to a permitted instruction. It will be appreciated that the step of branch instruction checking performed at step 44 may be omitted if desired. If the branch instruction check performed at step 44 indicates that a previous instruction is not a permitted branch instruction, then processing proceeds to step 42 as previously described. If the previous instruction is a permitted branch instruction, then processing proceeds to step 38 as previously described and the value to be used as the domain value for the previous instruction in future comparisons is updated and then the next instruction is passed for further processing.

Figure 4:
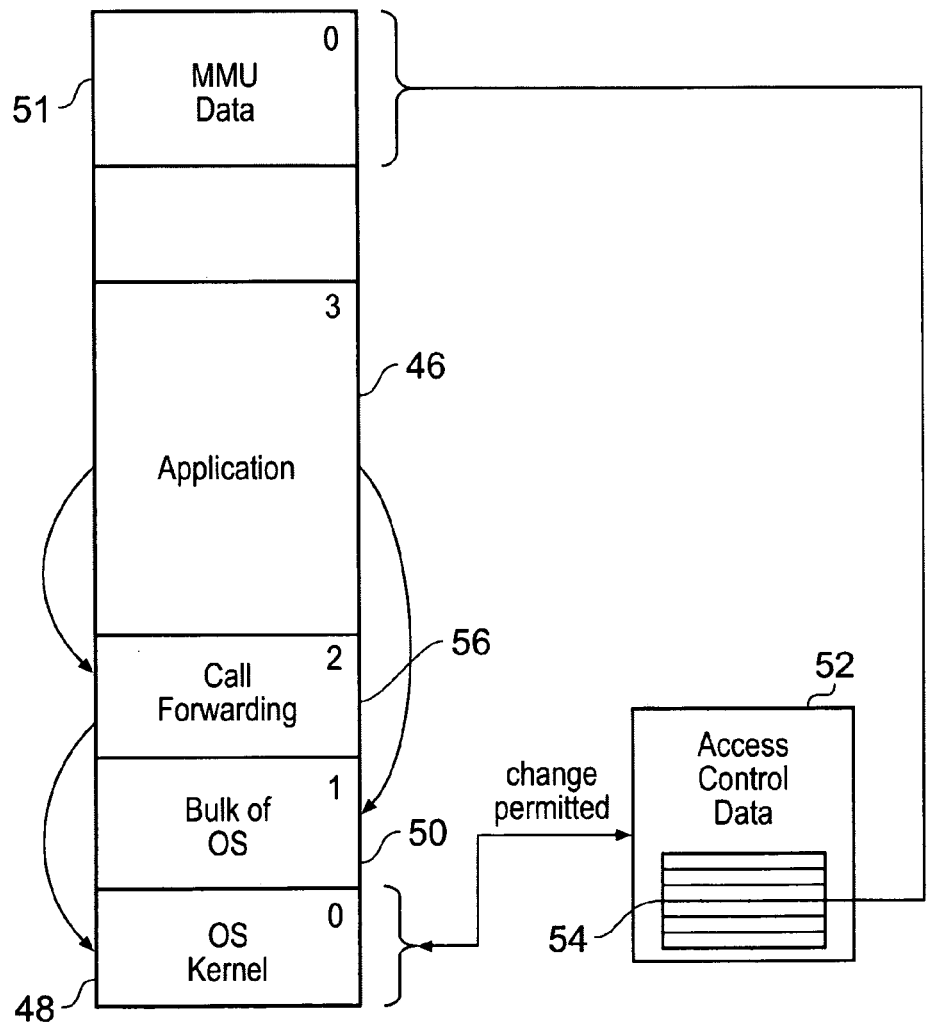
FIG. 4 is a diagram schematically illustrating a system in which a call forwarding program is used to forward application calls into a kernel of a operating system.

FIG. 4 schematically illustrates a system using a call forwarding program between an application program 46 and the kernel 48 of an operating system. Memory management unit data comprising access control data 51 is stored within the memory address space and access to this access control data is permitted only to the kernel 48. This effectively locks the access control data 51 such that it cannot be altered by the application code 46, or even the bulk of the operating system code 50. If a memory abort occurs when the application code is executing, then the exception handling for that memory abort which requires a page table walk through the access control data 51 to be performed is run using addresses generated on the basis of the physical address space and accordingly without requiring the application code 46 to have access to the access control data 51.

Also forming part of the access control data are data elements 52 which comprise control registers and pointers 54. These both point to the translation table data 51, as well as controlling and representing other access control parameters, (e.g. MMU enable/disable; translation table pointer; endianess configuration; access to capability control registers of the domains; access to which capability control register is currently selected etc). The ability to change the access control data 52, is in this example, reserved to the domain "0" illustrated in FIG. 4, which contains the operating system kernel 48 and the translation table data 51. The ability to change the domain capabilities, since it forms part of the access control data 52, is reserved to the operating system kernel. This increases resistance to subversion by unauthorized application code or unauthorized portions of code forming part of the bulk of the operating system 50.

As previously discussed, the application code 46 may wish to make a call to the kernel 48. In order to increase the security of the kernel 48, the access control data may be configured so as to provide no access (even read access) to the kernel 48 from the domain in which the application 46 is executing (i.e. domain 3). Accordingly, any attempt to make a direct call from application 46 to the kernel 48 would result in a memory abort as that area of memory would either simply be unmapped or denied for access by the user mode application program 46. Accordingly, when the application code 46 wishes to make a call to the kernel 48, it does so by first making a call to a call forwarding program 56. This call forwarding program is visible to the application code 46 and is in a separate domain (in this example domain 2). Domain 2 does have access to domain 0 in which the kernel resides and accordingly can pass the call forward into the kernel 48 and access the desired functionality of the kernel 48. Since the call forwarding program 56 has a relatively simple form dedicated to this function of call forwarding it can be small and readily verified as secure and not having been subject to alteration. Thus, the details of the operation of the kernel 48 can be hidden, access to the kernel can be controlled to be via authorized entry points and the mechanisms controlling the above security enhancements can be simple and in a form that is readily checked for its own integrity.

Figure 5:
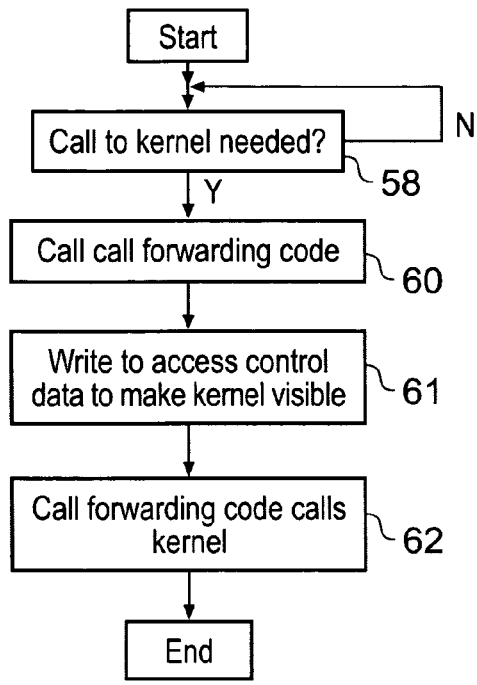
FIG. 5 is a flow diagram schematically illustrating the use of call forwarding code.

FIG. 5 is a flow diagram schematically illustrating the call forwarding processing discussed above. This technique can be used as an alternative to or an addition to the branch target instruction control discussed above. At step 58 the processing waits until there is a need to call the kernel 48. At step 60 a call is made to the call forwarding program 56. Step 61 uses the capability of the call forwarding code to write the access control data to alter this data so as to make the kernel code visible. At step 62 the call forwarding program 56 makes a call to the kernel 48 on behalf of the application code 46. When transferring back, the kernel passes to the call forwarding code, which then makes the kernel code invisible, before jumping back to the user code.

Figure 6:
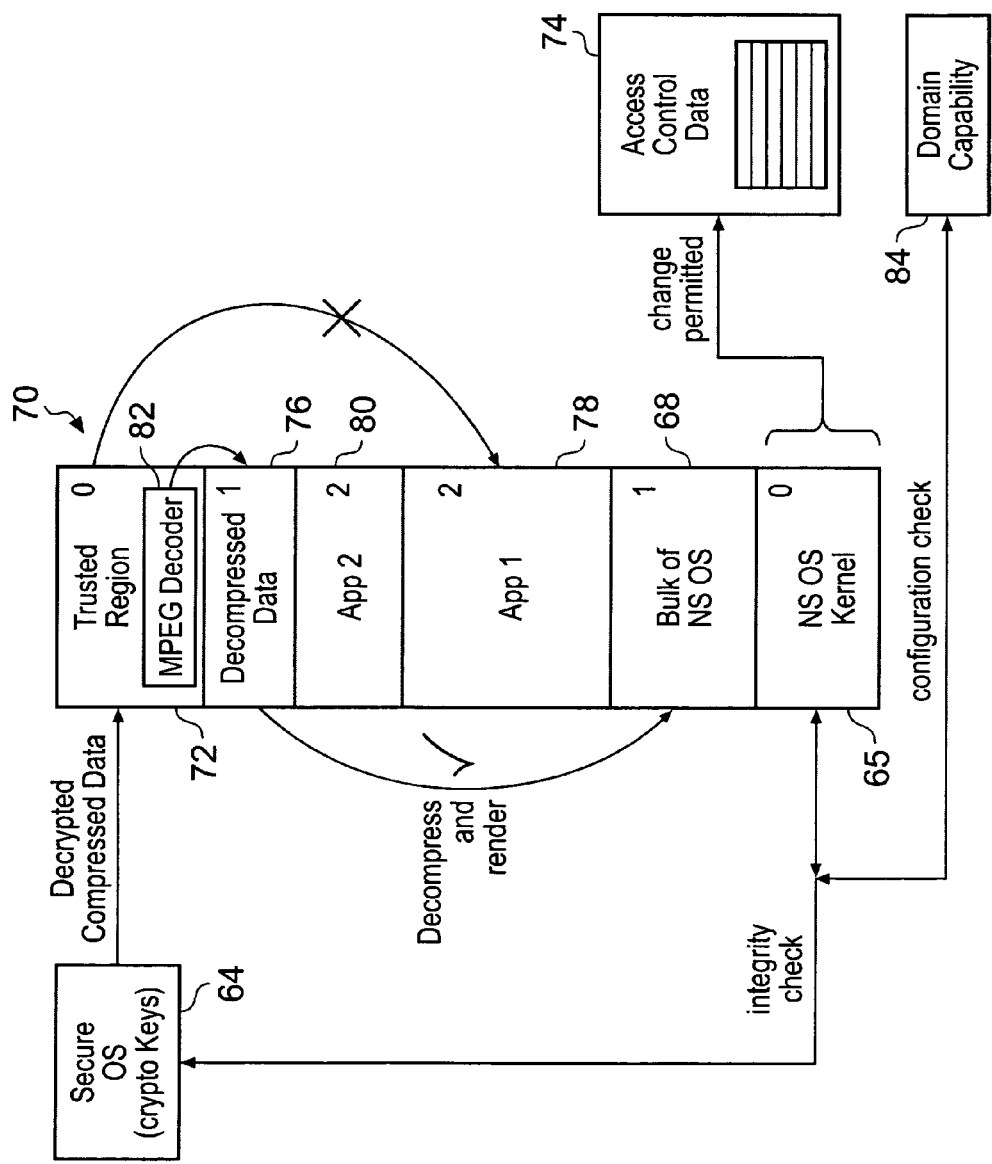
FIG. 6 is a diagram schematically illustrating the use of a trusted region of memory space into which a secure operating system can write data and from which a trusted program can read data when operating in a non-secure state.

FIG. 6 is a diagram schematically illustrating the operating system including a secure operating system 64 operating in a secure state and a non secure operating system 66, 68 operating in a non-secure state. The secure state and the non-secure state are provided in accordance with the TrustZone architecture and mechanisms of the processors produced by ARM Limited Cambridge England. For each of the secure and non-secure physical address spaces the virtual memory address space 70 is divided into number domains. Domain 0 contains the kernel 66 of the non-secure operating system and a trusted region of memory 72. The kernel 66 of the non-secure operating system is responsible for controlling the access control data 74 as previously discussed. This access control data 74 controls which memory regions are able to be accessed by which levels of privilege and by which domains. The access to the trusted region 72 is restricted to the non-secure kernel 66 and these share a common domain, i.e. domain 0. The bulk of the non-secure operating system 68 is in domain 1 as well as a memory region 76 used to store decompressed data. This decompressed data in region 76 is accessible to the bulk of the operating system 68 is, but not accessible to application programs 78, 80 stored within domain 2.

The system of FIG. 6 is able to provide layered levels of security. The most secure data corresponding to cryptographic keys is restricted to be accessed only by the secure operating system 64 and exists in secure physical address space. The secure operating system 64 can use these cryptographic keys to decrypt requested data and write this decrypted compressed data to a trusted region 72 belonging to the non-secure operating system 66. This decrypted compressed data whilst not as sensitive in nature as the cryptographic keys nevertheless represents an asset which is desired to protect and has a level of security associated with it. Accordingly, the trusted region 72 is only accessible to program instructions executing within the domain 0, which has the highest security level. These trusted programs include the kernel 68 and an MPEG decoder program 82, which is stored within the trusted region 72 itself. The MPEG decoder program 82 decompresses the decrypted compressed data and writes this into a decompressed data region 76. This decompressed data region 76 is not accessible to the application programs 78, 80, but is accessible to the bulk of the non-secure operating system 68. Accordingly, the rendering mechanisms associated with the bulk of the non-secure operating systems 68 can be used to render the decompressed data and draw it to a screen, for example.

Prior to the secure operating system 62 writing the decrypted data into the trusted region 72, it can perform integrity checks upon the kernel 66 and the configuration of the domains as specified in the domain capability data 84 (stored within the domain capabilities registers described later). This integrity check may be in the form of a check summing, hashing or signature checking operation performed upon the relatively small kernel 66 as well as a configuration check upon the domain capability data 84 comprising ensuring that only the kernel 66 is provided with the ability to access access control data which will control which of the software executing in the non-secure state will be able to access the trusted region 72. Providing the kernel 66 is verified and only the kernel 66 has the necessary capability to change the access control data, then reasonable confidence can be had that the trusted region 72 is secure. Thus, the secure operating system 64 will devolve some of the processing required into the non-secure domain and thus enable the secure operating system to be simpler and accordingly more secure.

Figure 7:
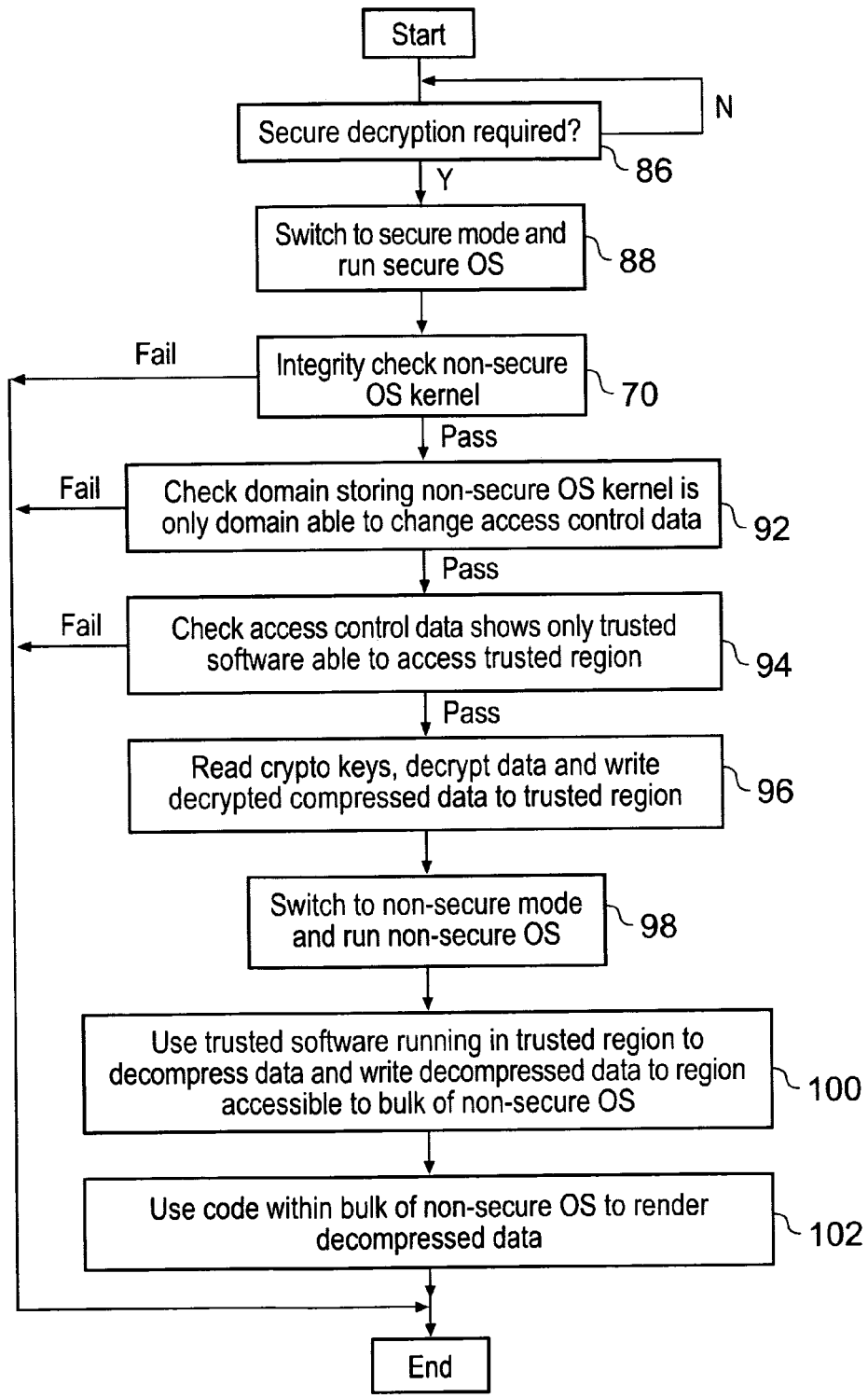
FIG. 7 is a flow diagram schematically illustrating a sequence of processing operations performed using the system illustrated in FIG. 6.

FIG. 7 is a flow diagram illustrating operation of the system of FIG. 6. At step 86 it is determined that secure decryption is required. At step 88, a switch is made to the secure state and the secure operating system is run. At step 90 the secure operating system integrity checks the non-secure operating system kernel 66. If this check fails, then processing terminates. If this check passes, then processing proceeds to step 92 at which a determination of the domain capability data 84 is made to ensure that the domain storing the non-secure operating system kernel 66 is the only domain able to change the access control data 74. If this check fails, then processing again terminates. If this check is passed, then processing proceeds to step 94 at which a determination is made that the access control data 74 shows that only trusted software (e.g. the non-secure operating system 66 and the MPEG decoder 82) is able to access the trusted region 72. If this check fails, then processing terminates. If this check is passed, then processing proceeds to step 96 at which the cryptographic keys are read by the secure operating system 64 (or supplied to an appropriate cryptographic engine) and decryption performed to generate decrypted compressed data which is written to the trusted region 72. Step 98 then switches to the non-secure state and the non-secure operating system is run. Step 100 uses trusted software 82 (MPEG decoder) running in the trusted region 72 to decompress the decrypted compressed data and to write the decompressed data into a decompressed data region 76 which is accessible to the bulk of the non-secure operating system 68. Step 102 then uses a program code within the bulk of the non-secure operating system 68 to render the decompressed data and draw it to, for example, a computer screen.

Figure 8:
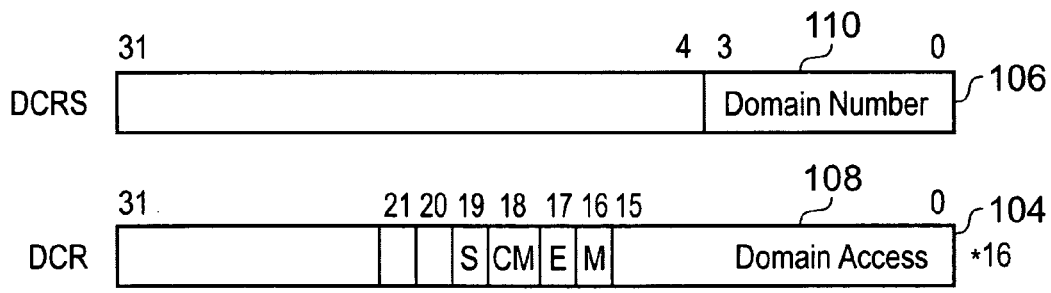
FIG. 8 is a diagram schematically illustrating programmable capability data associated with different domains within the memory address space.

FIG. 8 illustrates schematically the domain capabilities registers 104 and the domain capabilities select register 106. There are sixteen domain capability registers 104 with one being provided for each of the sixteen different domains into which the memory address space (virtual or physical) can be divided. Domain access data 108 for each domain indicates in respect of each of the fifteen other domains whether or not access to that other domain is free, managed or not permitted. Managed access will include the instruction access checking previously described to ensure that transitions into that domain from the current domain, corresponding to the control register 104 in question, are to permitted branch target instructions, and possibly from permitted branch instructions. Various flags within the main control register 104 also specify settings relating to the general memory management, such as MMU enable/disable, a translation table pointer, register access capability, the ability to change endianess, the ability to change the domain capability registers 104 themselves or the domain capability registers select register 106. The domain capability register 104 also includes exception controlling flags which, for example, control whether or not program instructions executing in that the domain are able to change vector table pointers and switch on or off a particular response associated with exceptions and other activity. Further flags corresponding to items of system management which it is desired to control on a domain-by-domain basis within the domain capabilities registers 104 can include capabilities such as whether or not cache maintenance can be turned on or off in that domain. One flag, S, controls the ability to execute SMC instructions which are software interrupts used for changing between the secure and non-secure states.

The domain capability register select register 106 includes a domain number field 110 which specifies that the number of the domain capability register 104 currently mapped in for reading and writing if the domain concerned has the appropriate permissions to read and write that domain capability register (see Flags M).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a memory addressable with a memory address having a value within a memory address space, said memory address space having a plurality of domains, each of said domains comprising a set of memory addresses and each memory address belonging to at least one domain;
   processing circuitry coupled to said memory and configured to perform data processing operations in response to a sequence of program instructions associated with respective memory addresses;
   memory access control circuitry coupled to at least one of said memory and said processing circuitry and configured to control whether said processing circuitry can access a given memory address in response to access control data for different regions of said memory address space; and
   domain control circuitry coupled to said processing circuitry and configured to control whether an instruction to be processed can change said access control data in response to which of said plurality of domains a memory address of said instruction is associated, wherein a secure operating system is executed upon said apparatus in a secure state and a non-secure operating system is executed upon said apparatus in a non-secure state, wherein in said non-secure state said non-secure operating system writes said access control data such that said memory access control circuitry provides a trusted region of said memory address space which can be accessed by trusted software and cannot be accessed by non-trusted software, said domain control circuitry serving to prevent software stored within a domain other than a domain storing said non-secure operating system from changing said access control data and so providing access to said trusted region to non-trusted software.

2. Apparatus as claimed in claim 1, wherein said access control data specifies whether, in dependence upon a current domain of said instruction to be processed said processing circuitry has with respect to said given memory address one of:
   no access;
   full access; and
   access as controlled by other parameter.

3. Apparatus as claimed in claim 1, wherein said access control data also controls whether or not said processing circuitry is permitted to execute at least some types of instruction.

4. Apparatus as claimed in claim 1, wherein a secure operating system is executed upon said apparatus in a secure state and a non-secure operating system is executed upon said apparatus in a non-secure state.

5. Apparatus as claimed in claim 1, wherein secure data of a first security level is only accessible to said secure operating system in said secure state and secure data of a second security level is written by said secure operating system into said trusted region to be accessible to said trusted programs in said non-secure state, said second security level being less secure than said first security level.

6. Apparatus as claimed in claim 1, wherein said processing circuitry has a current mode of operation selected from among a plurality of modes of operations and said memory access control circuitry is responsive to further access control data specifies access permissions in dependence upon said current mode of operation.

7. Apparatus as claimed in claim 6 wherein said plurality of modes include a user mode and a privileged mode.

8. Apparatus as claimed in claim 1, wherein said memory address space is virtual memory address space associated with said memory, said plurality of domains are domains within said virtual memory address space and memory management circuitry maps virtual memory addresses to physical memory addresses using translation table data, said translation table data being access control data.

9. Apparatus as claimed in claim 8, wherein said translation table data is stored at a location specified by a translation table pointer value stored within a translation table pointer value register, said translation table pointer value being access control data to which said memory access control circuitry controls access.

10. Apparatus as claimed in claim 1, wherein said plurality of domains each have respective programmable capabilities associated therewith.

11. Apparatus as claimed in claim 10, wherein when said programmable capabilities for each domain include one or more capability specifying values that control said domain control circuitry as to whether that domain is permitted by said domain control circuitry to change said access control data.

12. Apparatus as claimed in claim 10, wherein said programmable capabilities for each domain include whether or not program instructions associated with that domain can alter said programmable capabilities for said plurality of domains.

13. Apparatus as claimed in claim 1, wherein a kernel portion of an operating system executing upon said apparatus is stored within a domain permitted to change said access control data.

14. Apparatus as claimed in claim 13, wherein remaining portions of said operating system are stored within a domain not permitted to change said access control data.

15. Apparatus as claimed in claim 13, wherein an application program is stored within a domain not permitted to change said access control data.

16. Apparatus as claimed in claim 13, wherein an application program is stored within a region of memory not having read access to said kernel, said application program making a call to said kernel via a call forwarding program stored within a region of memory that does have read access to said kernel.

17. Apparatus as claimed in claim 1, wherein in said secure state said secure operating system writes secure data to said trusted address space of said memory address space.

18. Apparatus as claimed in claim 17, wherein, before writing said secure data to said trusted region, said secure operating system integrity checks said non-secure operating system and checks said domain control circuitry is configured to only allow software stored with said domain storing said non-secure operating system to change said access control data.

19. Apparatus as claimed in claim 18, wherein said secure operating system integrity checks said non-secure operating system by performing upon said non-secure operating system one or more of:
   a check summing operation;
   a hashing operation; and
   a signature checking operation.

20. A method of processing data, said method comprising the steps of:
   storing program instructions within a memory addressable with a memory address having a value within a memory address space, said memory address space having a plurality of domains, each of said domains comprising a set of memory addresses and each memory address belonging to at least one domain;
   performing data processing operations in response to a sequence of program instructions associated with respective memory addresses;
   controlling whether a given memory address can be accessed in response to access control data for different regions of said memory address space; and
   controlling whether an instruction to be processed can change said access control data in response to which of said plurality of domains a memory address of said instruction is associated, wherein a secure operating system is executed in a secure state and a non-secure operating system is executed in a non-secure state, wherein in said non-secure state said non-secure operating system writes said access control data to provide a trusted region of said memory address space which can be accessed by trusted software and cannot be accessed by non-trusted software and software stored within a domain other than a domain storing said non-secure operating system is prevented from changing said access control data and so providing access to said trusted region to non-trusted software.

21. A method as claimed in claim 20, wherein said access control data specifies whether, in dependence upon a current domain of said instruction to be processed, said given memory address is subject to one of:
   read and write access;
   read only access; and
   no access.

22. A method as claimed in claim 20, wherein said access control data also controls whether or not said processing circuitry is permitted to execute at least some types of instructions.

23. A method as claimed in claim 20, wherein a secure operating system is executed in a secure state and a non-secure operating system is executed in a non-secure state.

24. A method as claimed in claim 20, wherein secure data of a first security level is only accessible to said secure operating system in said secure state and secure data of a second security level is written by said secure operating system into said trusted region to be accessible to said trusted programs in said non-secure state, said second security level being less secure than said first security level.

25. A non-transitory computer program storage medium storing a computer program for controlling a computer to perform a method as claimed in claim 20.

26. A method as claimed in claim 20, wherein said memory address space is virtual memory address space associated with said memory, said plurality of domains are domains within said virtual memory address space and virtual memory addresses are mapped to physical memory addresses using translation table data, said translation table data being access control data.

27. A method as claimed in claim 26, wherein said translation table data is stored at a location specified by a translation table pointer value stored within a translation table pointer value register, said translation table pointer value being access control data to which access is controlled.

28. A method as claimed in claim 20, wherein said plurality of domains each have respective programmable capabilities associated therewith.

29. A method as claimed in claim 28, wherein when said programmable capabilities for each domain include one or more capability specifying values whether that domain is permitted to change said access control data.

30. A method as claimed in claim 28, wherein said programmable capabilities for each domain include whether or not program instructions associated with that domain can alter said programmable capabilities for said plurality of domains.

31. A method as claimed in claim 20, wherein a kernel portion of an operating system is stored within a domain permitted to change said access control data.

32. A method as claimed in claim 31, wherein remaining portions of said operating system are stored within a domain not permitted to change said access control data.

33. A method as claimed in claim 31, wherein an application program is stored within a domain not permitted to change said access control data.

34. A method as claimed in claim 31, wherein an application program is stored within a region of memory not having read access to said kernel, said application program making a call to said kernel via a call forwarding program stored within a region of memory that does have read access to said kernel.

35. A method as claimed in claim 20, wherein in said secure state said secure operating system writes secure data to said trusted region of said memory address space.

36. A method as claimed in claim 35, wherein, before writing said secure data to said trusted region, said secure operating system integrity checks said non-secure operating system and checks for a configuration that only allows software stored with said domain storing said non-secure operating system to change said access control data.

37. A method as claimed in claim 36, wherein said secure operating system integrity checks said non-secure operating system by performing upon said non-secure operating system one or more of:
   a check summing operation;
   a hashing operation; and
   a signature checking operation.

38. A method as claimed in claim 20, comprising selecting a current mode of operation from among a plurality of modes of operations, further access control data specifying access permissions in dependence upon said current mode of operation.

39. A method as claimed in claim 38, wherein said plurality of modes include a user mode and a privileged mode.

* * * * *